Oct. 3, 1950

L. M. EVANS ET AL 2,524,436

CLAMPING DEVICE

Filed Jan. 27, 1945

INVENTORS
LEON M. EVANS.
ROBERT B. HEATH.
BY
ATTORNEY

Oct. 3, 1950  L. M. EVANS ET AL  2,524,436
CLAMPING DEVICE
Filed Jan. 27, 1945  3 Sheets-Sheet 2
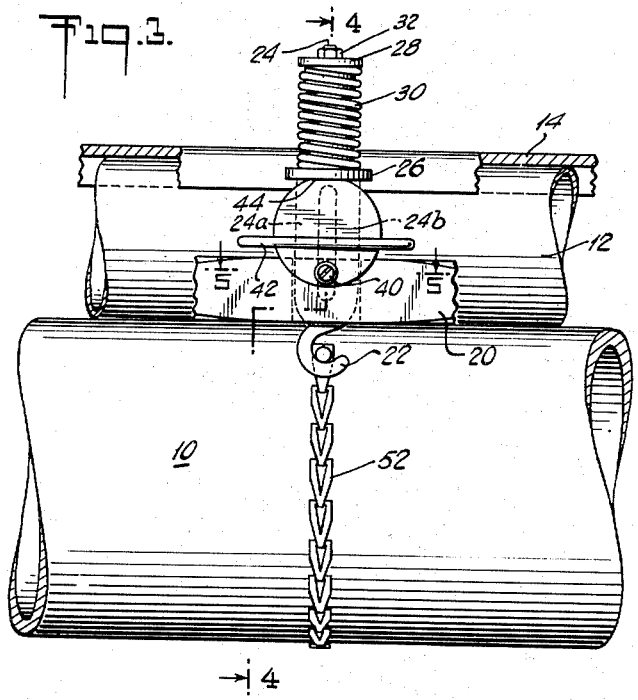
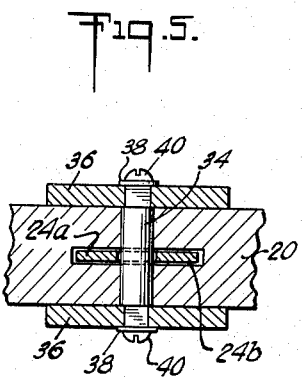
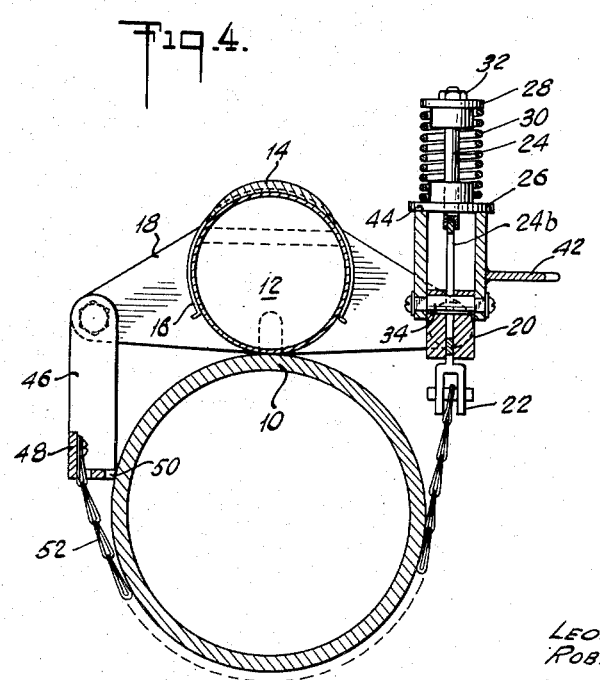
INVENTORS
LEON M. EVANS.
ROBERT B. HEATH.
BY Daniel Stryker
ATTORNEY Oct. 3, 1950
L. M. EVANS ET AL
2,524,436
CLAMPING DEVICE
Filed Jan. 27, 1945
3 Sheets-Sheet 3
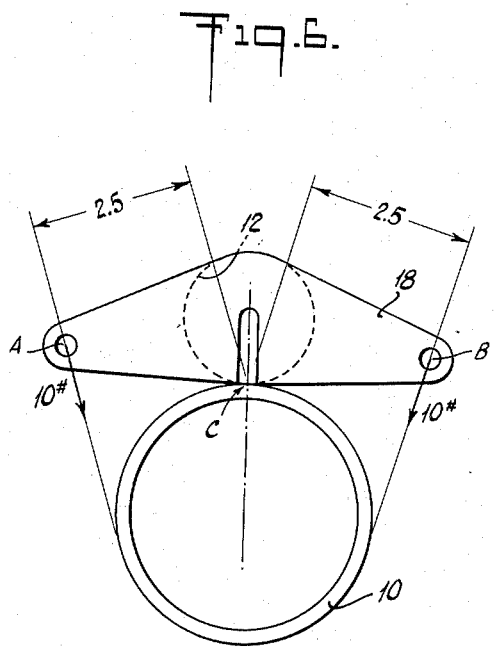
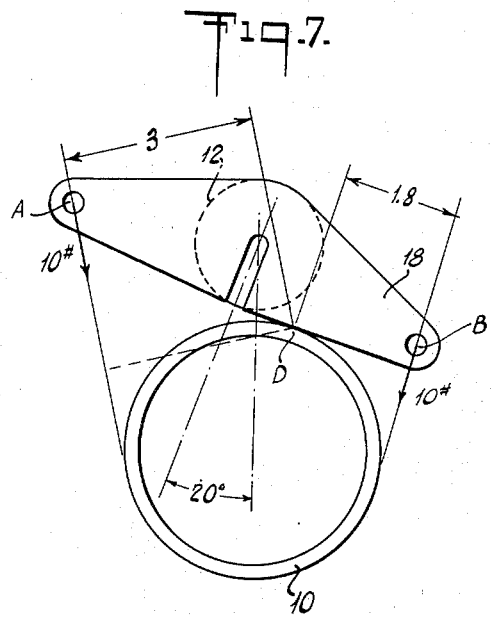
INVENTORS
LEON M. EVANS.
ROBERT B. HEATH
BY
Daniel Stryker
ATTORNEY Patented Oct. 3, 1950

2,524,436

UNITED STATES PATENT OFFICE 2,524,436

CLAMPING DEVICE

Leon Maurice Evans and Robert Bradford Heath, Houston, Tex., assignors to The Texas Company, New York, N. Y., a corporation of Delaware Application January 27, 1945, Serial No. 574,954

6 Claims. (Cl. 248—231)

This invention relates to clamping devices and more specifically to devices for clamping together two cylindrical or tubular members so that a predetermined plane through the axis of one of the members will pass through the axis of the other member.

There are occasions when it is necessary to clamp together two cylindrical or tubular members with the position of one of the members bearing a very specific relation to the other. For example, in one method of determining the thickness of a member such as the wall thickness of a pipe, a radioactive or electronic device is employed. The electronic device may be any one of several different types, but generally will include a source of radiation, a radiation detector and an amplifier all enclosed within a cylindrical housing and with suitable shielding interposed between the source of radiation and the detector so that the latter will not be affected by the direct beams of radiation from the source. In one form, the source of radiation is enclosed within a shielded member which is formed with an internal longitudinal collimating slot which serves to confine the radiation to a beam and to direct the beam to the wall of the member being measured. In another form the source of radiation is supported in the tip of a conically shaped shielding member whose base abuts one end of the cylindrical housing for the detector and amplifier units. Whatever the form of the electronic device, it is essential that it be clamped into position in exact axial alignment with the pipe to be measured and when properly aligned, the axis of the electronic unit and of the pipe are parallel. In addition to being properly aligned, it is important that in all tests the same portion of the periphery of the electronic device be exposed to the surface of the pipe to be measured. By so positioning the electronic device, comparable operating conditions are encountered in all tests.

It is an object of the present invention to provide a device which is capable of clamping together in a predetermined position two cylindrical or tubular members, one of which is a pipe, the wall thickness of which is to be measured while the other is an electronic device for making the measurements. It is a further object of the invention to provide a mechanism for maintaining a constant tension on the two cylindrical members to hold them in the desired position. These and other objects, features and advantages of the invention will more readily appear as the description thereof progresses and by referring to the accompanying drawings in which:

Figure 3 is a view similar to Figure 1, but partly in section, and showing the clamping device under tension and in operative position;

Figure 4 is a view in vertical section taken on line 4—4 of Figure 3;

Figure 5 is a sectional plan view taken on line 5—5 of Figure 3; and

Figure 6 illustrates diagrammatically the clamping device mounted in a balanced condition on the cylinder under test, while Figure 7 shows the same apparatus in an unbalanced condition.

Figure 1:
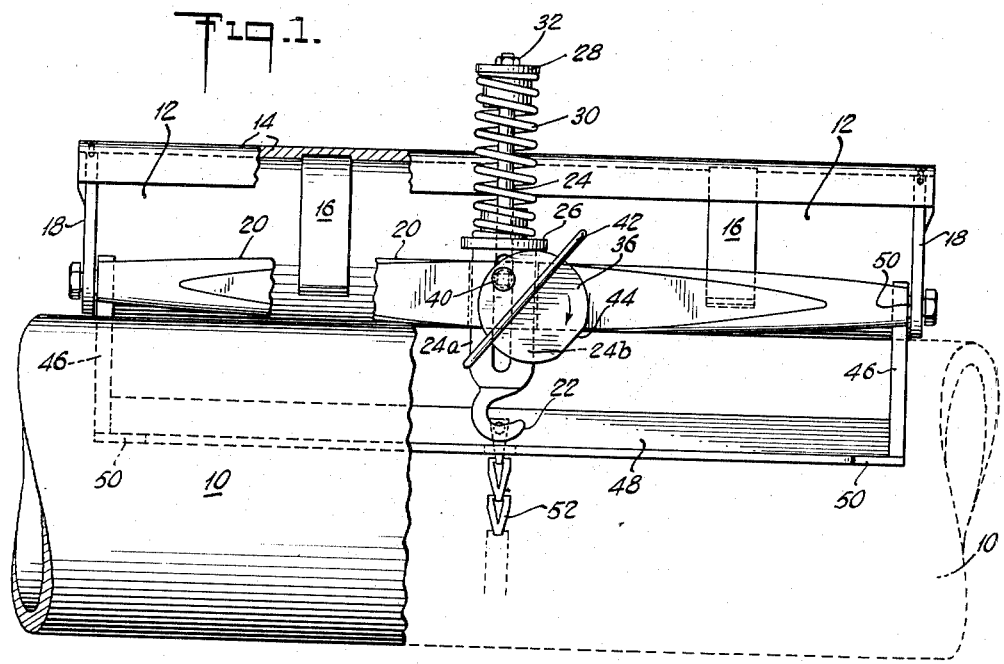
Figure 1 is a view showing a section of pipe, the wall thickness of which it is desired to measure, with the electronic device in position and ready to be clamped into operative position, a portion of the clamping device being broken away to show details of construction.
Figure 2:
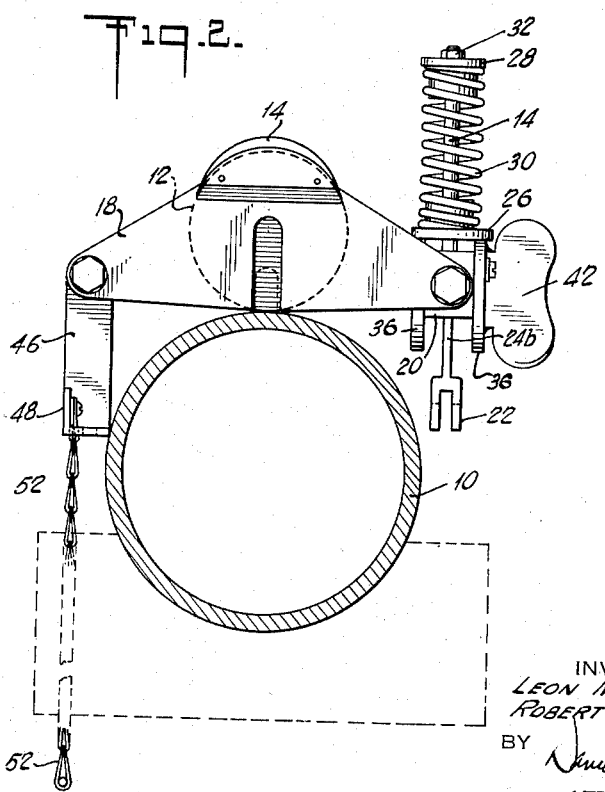
Figure 2 is an end view of the arrangement shown in Figure 1.

In Figure 1 a clamping device embodying the present invention is shown mounted in operative position on a pipe 10, the wall thickness of which is to be measured by means of an electronic device 12 which, as it forms no part of the present invention, need not be described. It is sufficient to say that the clamping device is adapted to hold the electronic device 12 against the pipe 10 and in such a position with respect to the pipe that the axis of the former is parallel to the axis of the latter.

The clamping device includes a curved bridge 14 which conforms generally to the shape and size of and fits over the top of the cylindrically shaped electronic device 12, and is provided on its lower face with spaced springs 16 which are curved to surround slightly more than one-half of the circumference of the device 12, the device simply being pushed into position between the open ends of the springs which hold it securely in place. The opposite ends of the bridge 14 are attached to the tops of spaced end plates 18 which are substantially triangular in form and the oppositely disposed wing sections of the two end plates are connected by a bar 20 which is provided at its ends with threaded holes to receive suitable bar screws by means of which the end plates 18, 18 and the bar 20 are secured together.

Midway between its ends the bar 20 is formed with flattened surfaces so that at that point it is substantially rectangular in cross-section and supports a tension mechanism which, as will be explained presently, serves to maintain the clamping device and the attached electronic device 12 in operative position and under constant and uniform tension during test periods. The tension mechanism includes a chain hook 22 formed with a shank 24 which is bifurcated throughout a portion of its length as shown at 24ª and 24ᵇ, the separate bifurcated sections of which extend through a slot provided in the bar 20. A spring washer 26 and a spring cap 28 are slidably mounted upon the upper portion of the shank 24 and interposed between them is a compression spring 30 which surrounds the shank 24. A nut 32 is screwed onto the upper end of the shank 24 for the purpose of holding the assembled spring washer, spring cap and spring in operative position on the shank.

Bar 20 is likewise formed with a hole which extends between its side faces at a point between the two bifurcated sections of the shank 24 and at right angles thereto. A cam pin 34 extends through this hole and the opposite ends of the pin are squared and fit into corresponding off-center square openings in spaced substantially circular cams 36, 36, the ends of the pin 34 being held in position in these openings by means of washers 38 and screws 40. A wing handle or key 42 is secured to the outer face of one of the cams 36 so that the cams can be turned together about the axis provided by the cam pin 34. A short section of the periphery of each of the two cams 36 diagonally opposite the ends of the pin 34, is flattened to provide a seat and lock 44 for the cams 36 when they are turned by means of the key 42 to exert maximum pressure against the spring washer 26.

A depending arm 46 is hingedly connected to each of the opposite wing sections of the end plates 18 and the lower ends of the two arms are connected by an elongated plate or chain bar 48 which has one longitudinal edge somewhat recessed throughout a portion of its length to provide at the opposite ends of the bar two similar contact surfaces 50, 50 which lie in a plane parallel to the longitudinal axis of the electronic device 12 when the latter is mounted in the bridge 14. One end of an elongated flexible member which preferably is in the form of a chain 52 is connected to the bar 48 intermediate its ends and when in operative position, the chain extends beneath the pipe 10 and its opposite or free end engages the hook 22.

When the clamping device and the electronic device 12 to which it is attached by means of the springs or clamps 16 are placed in operative position on the outer wall of the pipe or cylinder 10, the thickness of which wall is to be measured, the cylindrical electronic device 12 is positioned so that its axis is substantially parallel to the axis of the pipe, and the chain 52 is then extended snugly around the pipe and its free end is secured to the hook 22. When the clamping device is so positioned, the two contact surfaces 50, 50 engage the wall of the pipe 10 and as the two surfaces are in a plane parallel to the longitudinal axis of the device 12 the axial plane of the electronic device is aligned parallel to the axis of the pipe 10 under test. When the cams 36 are rotated through 180° by means of the key 42, they force the washer 26 upwardly and this in turn causes the spring 30 to be compressed and to exert an upward force on the shank 24 and hook 22. This movement of the hook 22 draws the chain 52 firmly around the pipe 10, holding the device 12 in contact with the pipe 10 and in axial alignment therewith. Tension on the chain 52 is increased as the cams 36 are turned through 180° until the point of sufficient tension is reached when the flattened edges 44 of the cams engage the lower surface of the spring washer 26 and lock the hook 22 and chain in this operative position.

Figures 6 and 7 show diagrammatically the comparative effect of positioning the cylinder 12 correctly and incorrectly. In the correct position shown in Figure 6, the two points A and B are balanced about their centroidal axis as indicated by the reference letter C which is on a radius of both the cylinder 12 and the pipe 10. Thus the momenta with respect to the point C which are exerted by the two forces at the points A and B are in balance and a beam of radiation from the source passes through the center of the pipe 10. In the event that the cylinder 12 is not positioned so that the beam of radiation passes into the diameter of pipe 10 the momenta with respect to the point of contact of the cylinder and pipe which are exerted by the two forces at the points A and B are out of balance. It is essential that proper balance can be obtained for correctly measuring the thickness of the wall of the pipe 10.

To illustrate, when the apparatus is in the balanced condition shown in Figure 6 the sum of the moments about the point C equals zero as indicated by the equation: $+10 \times 2.5 - 10 \times 2.5 = 0$. The apparatus in the unbalanced condition is shown in Figure 7 wherein the sum of the moments about the point D does equal zero as indicated by the equation: $+10 \times 3 - 10 \times 1.8 = 12$. In both of the foregoing equations the numeral 10# represents the force exerted in terms of pounds and the remaining numerals represent proportional units of measurement.

Obviously, many modifications and variations of the invention as herein described may be made without departing from the spirit and scope thereof, and accordingly only such limitations should be imposed as are indicated in the appended claims.

We claim:

1. A device for clamping two cylindrical members together in axial alignment comprising a bar supported by and parallel to one of said cylindrical members and having at its opposite ends surfaces which are in a plane parallel to the longitudinal axis of said one cylindrical member and which are adapted to contact the wall of the other cylindrical member, an elongated member having one end thereof secured to said bar intermediate the ends thereof and adapted to surround a portion of the second-named cylindrical member, and means supported by the first-named cylindrical member for maintaining said elongated member under tension to hold the two cylindrical members together in axial alignment.

2. A device for clamping two cylindrical members together in axial alignment comprising a bar supported by and parallel to one of said cylindrical members and having at its opposite ends surfaces which are in a plane parallel to the longitudinal axis of said one cylindrical member and which are adapted to contact the wall of the other cylindrical member, an elongated flexible member having one end thereof secured to said bar intermediate the ends thereof and adapted to surround a portion of the second-named cylindrical member, and spring actuated means supported by the first-named cylindrical member and to which the other end of the flexible member is attached for maintaining said flexible member under tension to hold the two cylindrical members together and in axial alignment.

3. A device for clamping two cylindrical members together in axial alignment comprising a bar supported by and parallel to one of said cylindrical members and having at its opposite ends surfaces which are in a plane parallel to the longitudinal axis of the cylindrical member by which it is supported and which are adapted to contact the wall of the other cylindrical member, a chain having one end thereof secured to said bar intermediate the ends thereof and adapted to surround a portion of the second-named cylindrical member, a hook to which the other end of said chain is attached, said hook having an elongated shank, resilient means on said shank for exerting pressure to move said shank longitudinally and pull the chain tightly around the second-named cylindrical member, and a cam for increasing the tension exerted by said resilient means on said chain and for locking said hook in the position of maximum tension.

4. A device for clamping a cylindrically shaped electronic device to a cylindrical member the wall thickness of which is to be measured by means of the electronic device, comprising a bridge in which the electronic device is removably mounted, substantially triangular shaped plates attached to the opposite ends of said bridge, depending arms hingedly secured to two of the oppositely disposed corners of said plates, an elongated bar connecting the free ends of said depending arms and having at its opposite ends surfaces which are in a plane parallel to the longitudinal axis of the bridge and which are adapted to contact the wall of the cylindrical member, a chain having one end thereof secured to said bar intermediate the ends thereof and adapted to surround a portion of the cylindrical member, and spring actuated means supported from said bridge and to which the other end of the chain is attached for maintaining said flexible member under tension to hold the electronic device in operative position on said cylinder and to force the two end surfaces of the bar into contact with the cylindrical member thereby aligning the axes of the electronic device and the cylindrical member.

5. In combination, an electronic device for determining the thickness of a member having a curved outer surface, means for supporting said electronic device in a predetermined position with respect to said curved surface, comprising a plurality of contact members depending from said supporting means and having contact surfaces which are in a plane parallel to the longitudinal axis of the electronic device, and means for maintaining the contact surfaces of said contact members against the curved outer surface of the member under test to align the electronic device and said member under test.

6. In combination, an electronic device enclosed within a cylindrical housing for determining the thickness of the wall of a cylindrical member, means for supporting said housing in a predetermined position against and in axial alignment with the curved outer surface of the said cylindrical member under test, comprising spaced contact members depending from said supporting means having contact surfaces in a plane parallel to the longitudinal axis of said electronic device within said housing, and spring actuated means for maintaining the contact surfaces of said contact members against the outer surface of the member under test to align the electronic device and the member under test.

LEON MAURICE EVANS.
ROBERT BRADFORD HEATH.

REFERENCES CITED

The following references are of record in the file of this patent:

UNITED STATES PATENTS

| Number | Name | Date |
|---|---|---|
| 882,850 | Troell | Mar. 24, 1908 |
| 1,191,762 | Conant | July 18, 1916 |
| 1,569,313 | Breer | Jan. 12, 1926 |
| 1,625,319 | Kenerson | Apr. 19, 1927 |
| 1,781,592 | Meier | Nov. 11, 1930 |
| 1,788,464 | Kederis et al. | Jan. 13, 1931 |
| 2,114,876 | Forbes | Apr. 19, 1938 |

FOREIGN PATENTS

| Number | Country | Date |
|---|---|---|
| 46,942 | Denmark | Feb. 13, 1933 |